(12) United States Patent
Prakash et al.

(10) Patent No.: US 8,254,924 B2
(45) Date of Patent: Aug. 28, 2012

(54) METHOD AND APPARATUS FOR ADAPTIVE REGISTRATION AND PAGING AREA DETERMINATION

(75) Inventors: Rajat Prakash, San Diego, CA (US); Fatih Ulupinar, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1109 days.

(21) Appl. No.: 11/455,063

(22) Filed: Jun. 15, 2006

(65) Prior Publication Data
US 2006/0286982 A1    Dec. 21, 2006

Related U.S. Application Data

(60) Provisional application No. 60/691,705, filed on Jun. 16, 2005.

(51) Int. Cl.
*H04W 4/00* (2009.01)

(52) U.S. Cl. ............... 455/435.1; 455/435.2; 455/435.3; 455/404.1; 455/414.2; 455/422.1; 455/433; 455/456.1; 455/456.2; 370/328; 370/338

(58) Field of Classification Search .... 455/435.1–435.3, 455/404.1, 414.2, 422.1, 433, 456.1, 456.2; 370/328, 338
See application file for complete search history.

(56) References Cited

U.S. PATENT DOCUMENTS

| | | | |
|---|---|---|---|
| 5,295,180 A | 3/1994 | Vendetti et al. | |
| 5,548,816 A | 8/1996 | DeVaney | |
| 5,642,398 A | 6/1997 | Tiedemann, Jr. et al. | |
| 2003/0050078 A1* | 3/2003 | Motegi et al. | 455/456 |
| 2005/0032529 A1* | 2/2005 | Akama | 455/456.2 |
| 2005/0089011 A1 | 4/2005 | Bender | |
| 2005/0159155 A1* | 7/2005 | Chen et al. | 455/435.1 |
| 2005/0186961 A1* | 8/2005 | Aikawa et al. | 455/435.1 |

FOREIGN PATENT DOCUMENTS

| | | |
|---|---|---|
| CL | 1429-2000 | 5/2000 |
| CL | 1430-2000 | 5/2000 |
| CL | 342-2002 | 2/2002 |
| CL | 916-2002 | 3/2002 |
| CL | 1521-2006 | 6/2006 |
| EP | 0260763 | 3/1988 |
| JP | 06327048 | 11/1994 |
| JP | 2004260477 | 9/2004 |
| WO | WO 94/13114 | 6/1994 |
| WO | WO0135373 A1 | 5/2001 |
| WO | WO2004089026 A1 | 10/2004 |

OTHER PUBLICATIONS

Castellucia et al., "An adaptive per-host IP Paging Architecture," Computer Communication Review, vol. 31, No. 5, pp. 48-56 (2001) XP-001115323.

(Continued)

*Primary Examiner* — Amancio Gonzalez
(74) *Attorney, Agent, or Firm* — François A. Pelaez

(57) ABSTRACT

Accordingly, a method adaptive registration is disclosed, wherein the access terminal adjusts the registration area based on mode and its location. Accordingly, the network also adjusts its paging area. Generally, the access terminal will transition from small registration area to large registration area based on its mobility.

46 Claims, 6 Drawing Sheets

OTHER PUBLICATIONS

International Search Report, PCT/US2006/023505, International Searching Authority, European Patent Office, Jan. 2, 2007.
Written Opinion, PCT/US2006/023505, International Searching Authority, European Patent Office, Jan. 2, 2007.
International Preliminary Report on Patentability, PCT/US2006/023505, the International Bureau of WIPO, Geneva, Switzerland, Dec. 17, 2007.
European Search Report—EP10013223, Search Authority—Munich Patent Office, Nov. 9, 2010.

European Search Report—EP10013230, Search Authority—The Hague Patent Office, Nov. 9, 2010.

* cited by examiner

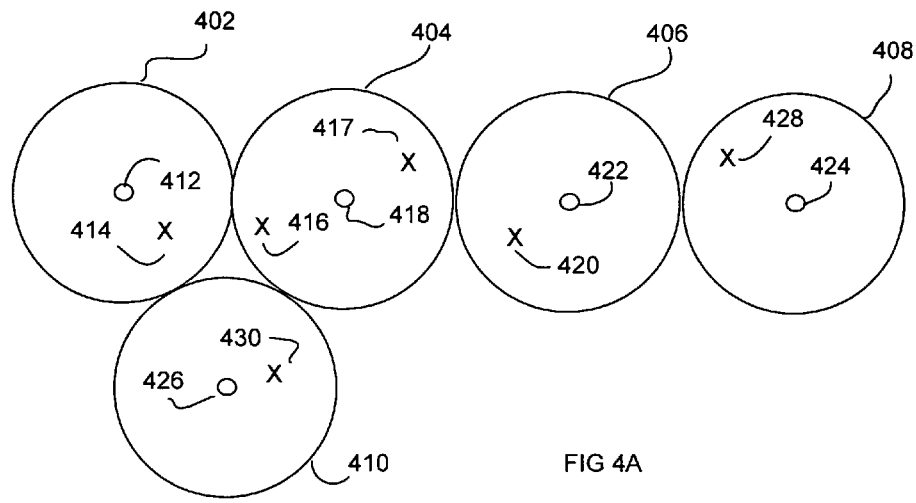
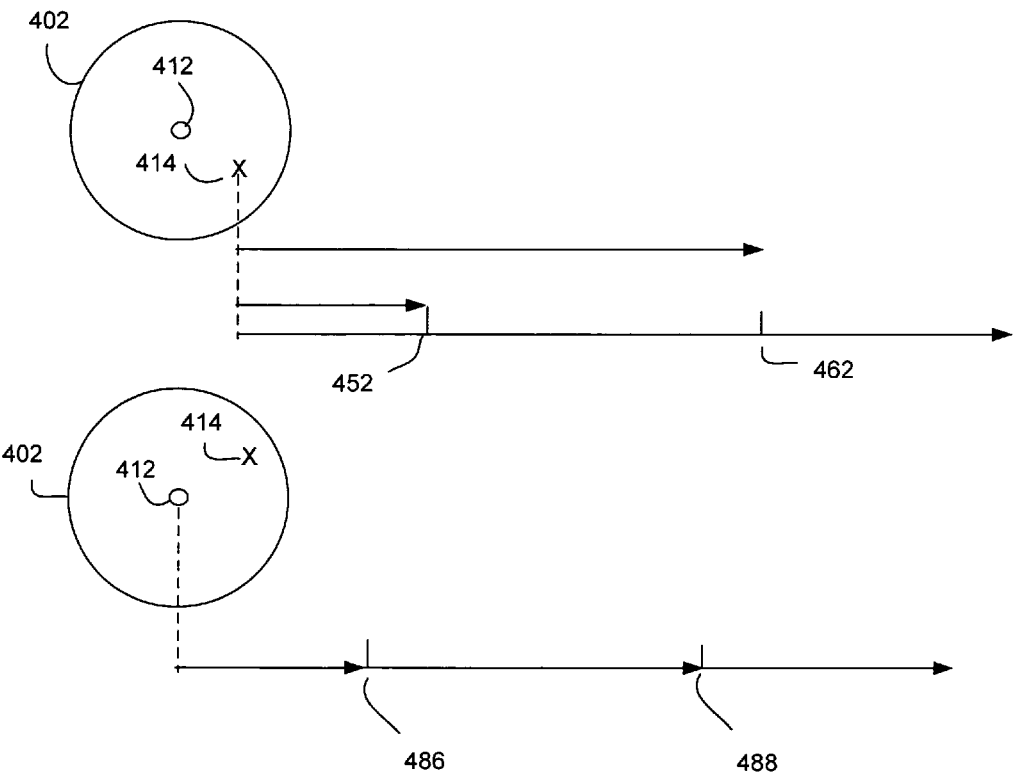

METHOD AND APPARATUS FOR ADAPTIVE REGISTRATION AND PAGING AREA DETERMINATION

CLAIM OF PRIORITY UNDER 35 U.S.C. §119

The present Application for Patent claims priority to Provisional Application No. 60/691,705 entitled "A METHOD OF ADAPTIVE REGISTRATION AND PAGING AREA DETERMINATION" filed Jun. 16, 2005, and assigned to the assignee hereof and hereby expressly incorporated by reference herein.

FIELD OF INVENTION

The present description relates generally to registration techniques in a communication system, more particularly to registration technique used with determining a paging area.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

In a communication system, the network consists of several base stations, each one of which communicates with one or more access terminals. Typical paging messages from the network are sent from a set of base stations (paging area) where the network determines that the mobile terminal is likely to be present. The area where pages are sent is called a paging area. The network resources required for paging increase with increase in the paging area. Thus, it is a desirable to minimize the paging area. The paging area is typically decided based on registrations, where the mobile terminal communicates its current position to the network.

In a wireless communication system, registration is the process by which the mobile terminal (i.e. access terminal) notifies the network of its location, status, ID, and other characteristics. The registration process allows the network to know how to find the access terminal so that it can page the access terminal when there is an incoming voice or data call. In order to conserve power (i.e. battery life) the access terminal enters into a power save mode. Another method is to reduce the number of times an access terminal registers with the network. The act of registration requires the access terminal to exit the power save mode and set up recourses to communicate with the base station.

Traditional methods attempt to conserve power by reducing frequency of registration. This may work well for those access terminals that are not mobile or stationary. However, reducing registration equates to the network increasing its resource to page the access terminal to ensure that the access terminal will receive a page, since the access terminal may be mobile (for example, traveling from one base station to another) within the network.

Thus there is a need to have method of adaptively adjusting the registration area and the paging area for access terminals that are mobile.

BRIEF SUMMARY

In an aspect, an apparatus comprises plurality of electronic devices, each having a logic, wherein the apparatus is configured use one or more electronic devices to determine if a first registration is required, perform a first registration, if determined that a first registration is required and to generate a second registration area.

In another aspect, method for adjusting the registration area, wherein the method to determine if a first registration is required, perform a first registration, if determined that a first registration is required and to generate a second registration area.

In another aspect, a machine-readable medium having instruction for determining if a first registration is required, for performing a first registration, if determined that a first registration is required, and for generating a second registration area.

A more complete appreciation of all the advantages and scope of the aspect can be obtained from the accompanying drawings, the description and the appended claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 4A illustrates the adaptive registration area using base stations coverage area;

FIG. 4B illustration distance based adaptive registration area according to another aspect;

FIG. 4C illustration distance based adaptive registration area according to another aspect;

DETAILED DESCRIPTION

Figure 1:
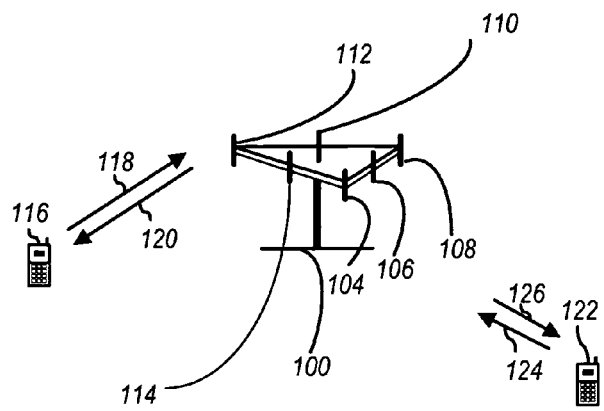
FIG. 1 illustrates a multiple access wireless communication system according to one aspect.

Referring to FIG. 1, a multiple access wireless communication system according to one aspect is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the aspect, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, the access point using beamforming to transmit to access terminals scattered randomly through its coverage causes less interference to access terminals in neighboring cells than a access point transmitting through a single antenna to all its access terminals.

An access point may be a fixed station used for communicating with the terminals and may also be referred to as an access point, a Node B, or some other terminology. An access terminal may also be called a mobile terminal, a user equipment (UE), a wireless communication device, terminal, access terminal or some other terminology.

Figure 2:
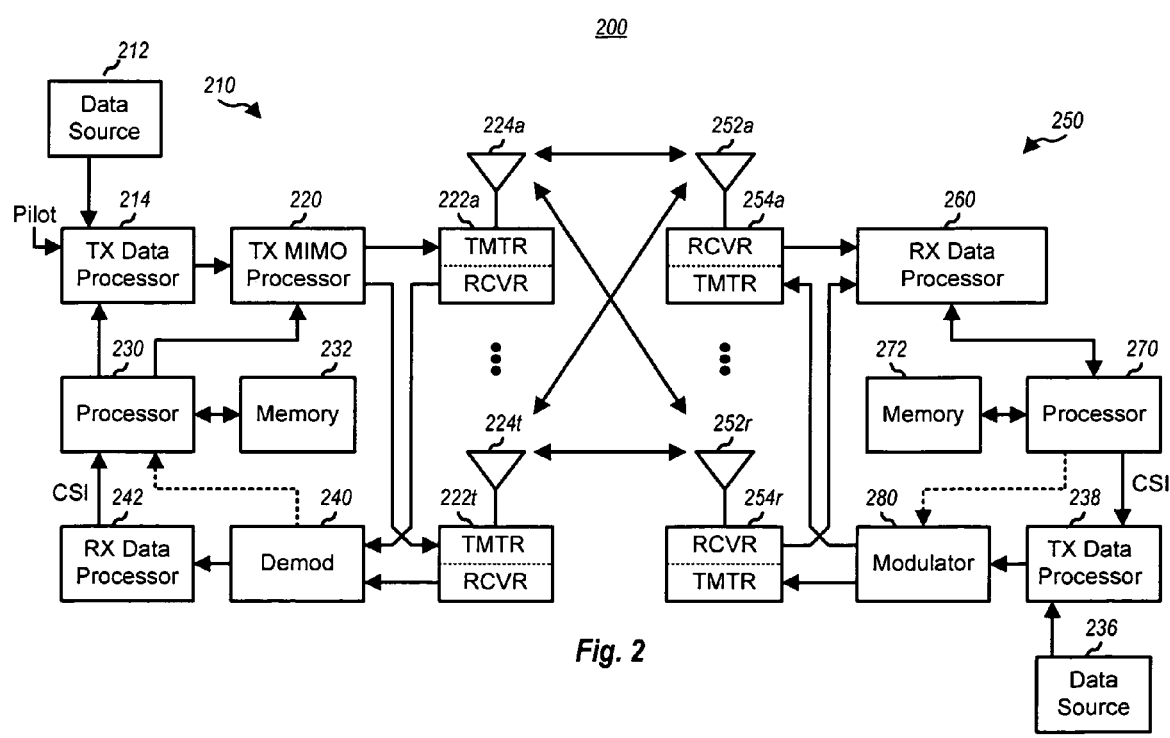
FIG. 2 a block diagram of a communication system.

FIG. 2 is a block diagram of an aspect of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data. In some aspects, TX data processor 214 applies beamforming weights to the symbols of the data streams using a pre-coding matrix.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects, TX MIMO processor 220 applies beamforming weights to the symbols of the data streams and to the antenna from which the symbol is being transmitted. This beamforming weights are determined using one of plurality of antenna by layer matrix, which may be retrieved from memory 232.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

While FIG. 2 discusses a MIMO system, the same system may be applied to a multi-input single-output system where multiple transmit antennas, e.g., those on a base station, transmit one or more symbol streams to a single antenna device, e.g., a mobile station. Also, a single output to single input antenna system may be utilized in the same manner as described with respect to FIG. 2.

Figure 3:
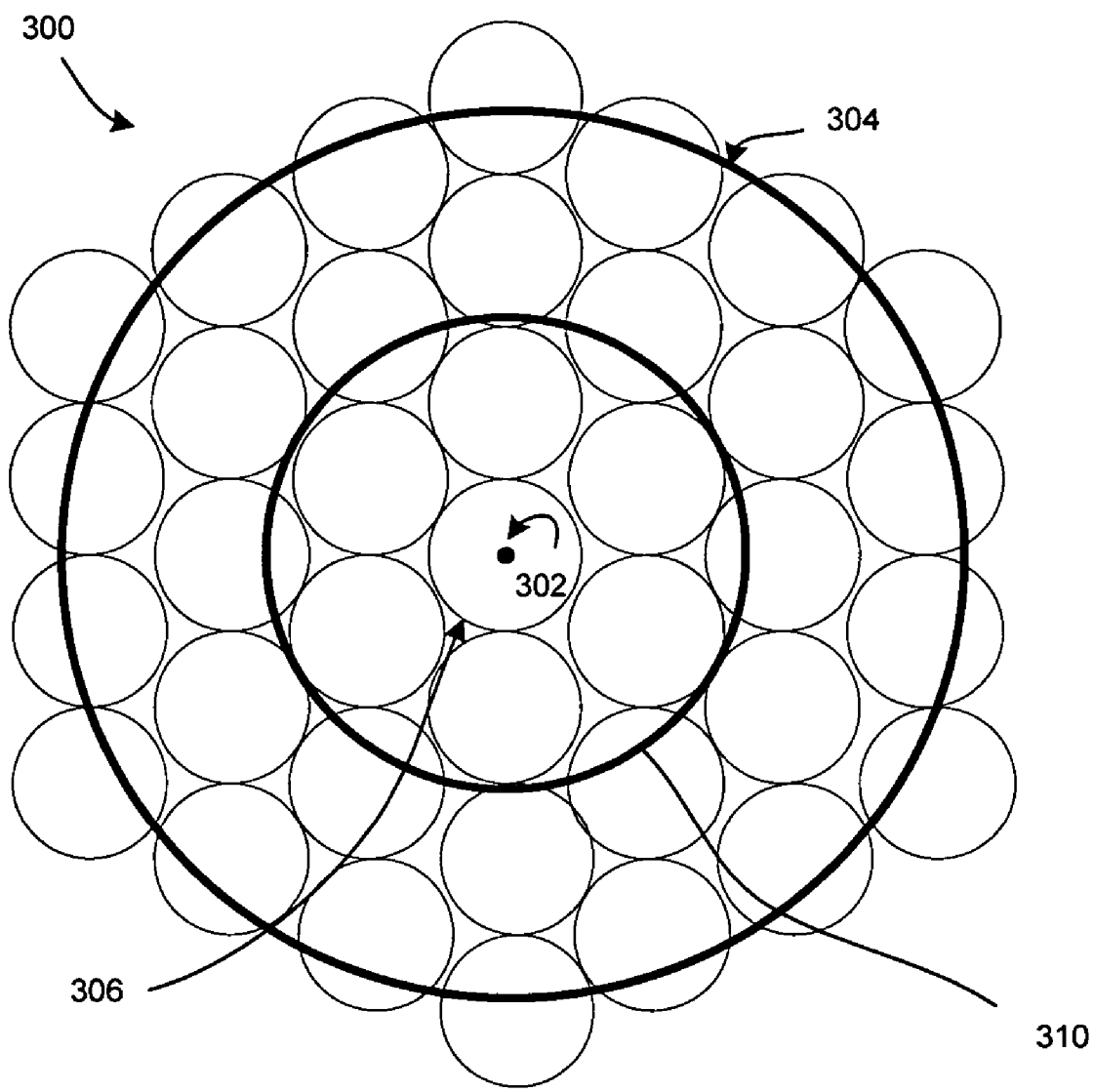
FIG. 3 illustrates adaptive registration areas according to an aspect.

FIG. 3 illustrates adaptive registration areas according to an aspect. Element 302, represents a location where the access terminal 116 entered the power saving mode. The element 308 represents the coverage area of base station, generally the first registration area. Element 310 represents a larger area (registration or paging area) according to an aspect, generally a second registration area. Element 304 represents a third area according to an aspect, generally the third registration area.

In an aspect, after a predefined time, the access terminal 116 enters into a power save mode. The power save mode (also referred to as idle mode) allows the access terminal 116 to conserver power by not maintaining power consuming resources, such as registration resources. When in power save mode, in access terminal's memory, there are several attributes that are stored and accessed by the processor to determine set of actions. For example, among other things, attributes for registration boundary. As long as the access terminal 116 is within the registration boundary, the access terminal 116 need not continue to register after initial registration, unless network specifically requires it.

According to an aspect, after entering into power save mode, the access terminal 116 periodically determines its location to determine if a registration is required (for referred to as access terminal 116 waking up). The access terminal 116 may also notify the network that it has entered into power saving mode. If determined that a registration is required, the access terminal 116 executes a registration scheme in which the access terminal 116 sets ups resources with the current base station and registers with the network using the base station. This initial registration after entering the power save mode is considered as the first registration. Subsequent registrations after the first registration, while in power saving mode are referred to as a second registration, a third registration, etc. In the response to each registration after the access terminal 116 has entered into the power save mode, both the network and access terminal 116 adapt to registrations and assume that the registration area requires a change. Also, the network concurrently assumes that the registered access terminal 116 is mobile and adjusts the paging area.

In an aspect, each time the access terminal 116 enters the power save mode, the network and access terminal 116 restarts the registration count. For example, the registration count may be as follows: first registration, second registration, third registration, restart, first registration, second registration, restart, etc. A wireless system may also use other methods to restart the registration count, such a expiration of predefined time, the access terminal 116 traveling a predefined distance from location where it entered the power save mode, access terminal 116 switching from power save mode to another mode, etc.

According to an aspect, in determining if the initial or subsequent registrations are required, the access terminal 116 determines if the access terminal 116 is outside a registration boundary. The registration boundary (i.e. registration area) may be determined by several methods. Depending on load of the system or preference of operators of the system, the registration boundary may be base station coverage area based or distance based. The base station coverage based method comprises coverage area of one or more base station as the registration or paging area. The distance based method comprises a delta distance from the location where the access terminal 116 entered the power save mode or a delta distance from the base station where the access terminal 116 entered the power save mode.

FIG. 4A illustrates the adaptive registration area method based on a base stations coverage area 400. FIG. 4A illustrates several base stations 412, 418, 422, 424 and 426 having a coverage area 402, 404, 406, 408, and 410 respectively. Elements 414, 416, 417, 420, 428 and 430 illustrate the location of the access terminal 116 where the access terminal 116 performs a determination whether to register. As an example, location 414 represents the location where the access terminal 116 entered into a power saving mode for the first time. According to the aspect, when the access terminal 116 enters into power saving mode, the registration area (i.e. the initial or first registration area) is set to base station coverage area 402. While in power saving mode, if the access terminal 116 has traveled to location 416, then access terminal 116 determines that it has traveled out of its registration area and must register with network to notify its new location. This determination may be made using the current location of the access terminal 116. Various techniques may be employed to determine the current location, for example using Global Position System or the current serving base station identification (ID).

According to the base station coverage method, the new registration area (i.e. second registration area) is now includes the coverage area of current serving base station 418 (i.e. coverage area 404) in addition to the initial coverage area 402. In another aspect, the second registration area may include one or more base station coverage areas surrounding the base station 412, for example base station 428 and coverage area 410. In response to the first registration, the network will also update the paging area to include the base station coverage area 404. Initially in order to converse paging resources, the network and access terminal 116 will limit the second registration area to adding only one base station coverage area. Thus, while access terminal 116 is at location 417, the access terminal 116 will determine that it does not need to re-register and also the network will use base station 412 and 418 to page the access terminal 116. If the access terminal 116 continues to travel outside second registration area, for example to location 420, then the access terminal 116, again based on its location, will determine that registration is required and will perform a second registration. In an aspect, when the second registration is performed, a new registration area is created (i.e. the third registration area) which includes all the areas of second registration area and coverage area 406 of bases station 422. Similar to the second registration area, additional base stations sounding the second registration area my also be included. Also, in an aspect, the second registration area may also include base station coverage area 408 of base station 424. Thus, making third registration area to include base station coverage areas 402, 404, 406, 408 and 424. Use of surrounding base stations may be employed based on current load of the system or may be predefined at the time of deploying the system.

FIG. 4B illustration distance based adaptive registration area according to another aspect. Element 414 represent the location where the access terminal 116 entered power saving mode. Elements 452 and 462 are predefined distances that define the radius of registration area starting from location 414 of access terminal 116. According to the aspect, when the access terminal 116 enters into power saving mode at location 414, the registration area (i.e. the initial registration area) is set to base station coverage area 402. If the access terminal 116 travels out of initial registration area, then the access terminal 116 determines that a registration is required. Thus, access terminal 116 performs a first registration after entering the power saving mode. After performing the first registration, the new registration area (i.e. second registration area) is determined and includes a radial geographical area in addition to initial registration area 402. The radius of the second registration area is distance between location 414 and location 452. In response to the first registration, the network will also update the paging area to include the second registration area. Initially in order to converse paging resources, the network and access terminal 116 will limit the second registration area and make the radius small, for example 2 miles. Thus, while the access terminal 116 is within the geographical area defined by second registration area, the access terminal 116 need not perform any additional registrations to receive the pages. The network will not adjust the paging area. If the access terminal 116 continues to travel outside second registration area, then the access terminal 116 again based on its location will determine that registration is required and will perform a second registration. In an aspect, when the second registration is performed, a new registration area is created (i.e. the third registration area) which includes radial geographical area in addition to second registration area, wherein the radius of the third registration area is distance between location 414 and location 462. In response to the second registration, the network will also update the paging area to include the third registration area.

FIG. 4C illustration distance based adaptive registration area according to another aspect. Element 414 represent the location where the access terminal 116 entered power saving mode. Elements 486 and 486 are predefined distances that define the radius of registration area starting from location of base station 412. According to the aspect, when the access terminal 116 enters into power saving mode at location 414, the registration area (i.e. the initial registration area) is set to base station coverage area 402. If the access terminal 116 travels out of initial registration area, then it determines that a registration is required. Thus, access terminal 116 performs a first registration after entering the power saving mode. After performing the first registration, the new registration area (i.e. second registration area) includes a radial geographical area in addition to initial registration area 402, wherein the radius of the second registration area is distance between location of base station 412 and location 486. In response to the first registration, the network will also update the paging area to include the second registration area. Initially in order to converse paging resources, the network and access terminal 116 will limit the second registration area make the radius small, for example 2 miles past the coverage area 402. Thus, while the access terminal 116 is within the geographical area defined by second registration area, the access terminal 116 need not perform any additional registrations to receive the pages. If the access terminal 116 continues to travel outside second registration area, for, then the access terminal 116 again based on its location will determine that registration is required and will perform a second registration. In an aspect, when the second registration is performed, a new registration is created (i.e. the third registration area) which includes radial geographical area in addition to second registration area, wherein the radius of the third registration area is distance between location 414 and location 488. In response to the second registration, the network will also update the paging area to include the third registration area.

Depending on the deployment of the system, additional registration areas may be added as described in FIGS. 4A, 4B and 4C. Also, additional methods may be used to perform adaptive registration area.

Figure 5:
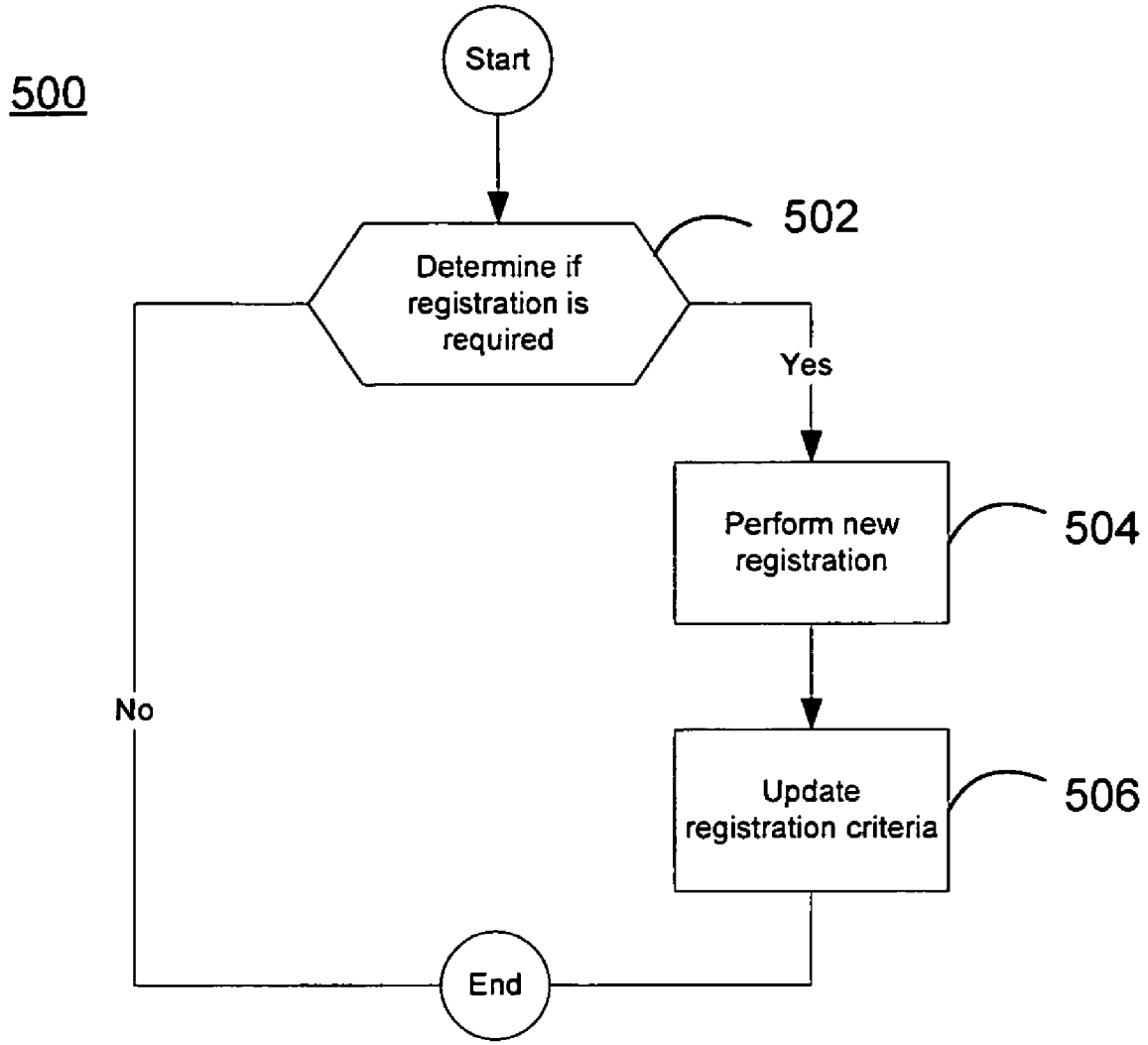
FIG. 5 illustrates a flow of methodology used by access terminal.

FIG. 5 illustrates a flow of methodology used by access terminal 116. At block 502, the access terminal 116 determines if a registration is required. The access terminal 116 while in power saving mode, periodically checks its location (i.e. wakes up) and determines if it has crossed current registration area. As described in FIG. 4A-4C, the access terminal 116 uses its current location to determine if the access terminal 116 is out of registration area. If the access terminal 116 determines that it has crossed the registration area, then access terminal 116 determines that a new registration is required. At block 504, the access terminal 116 transmits a registration message to perform a new registration. In aspect, the message includes the current location and base station ID of the current service base station. At block 506, upon completion of or concurrent to the registration process, the access terminal 116 updates its database to adjust the registration area.

Figure 6:
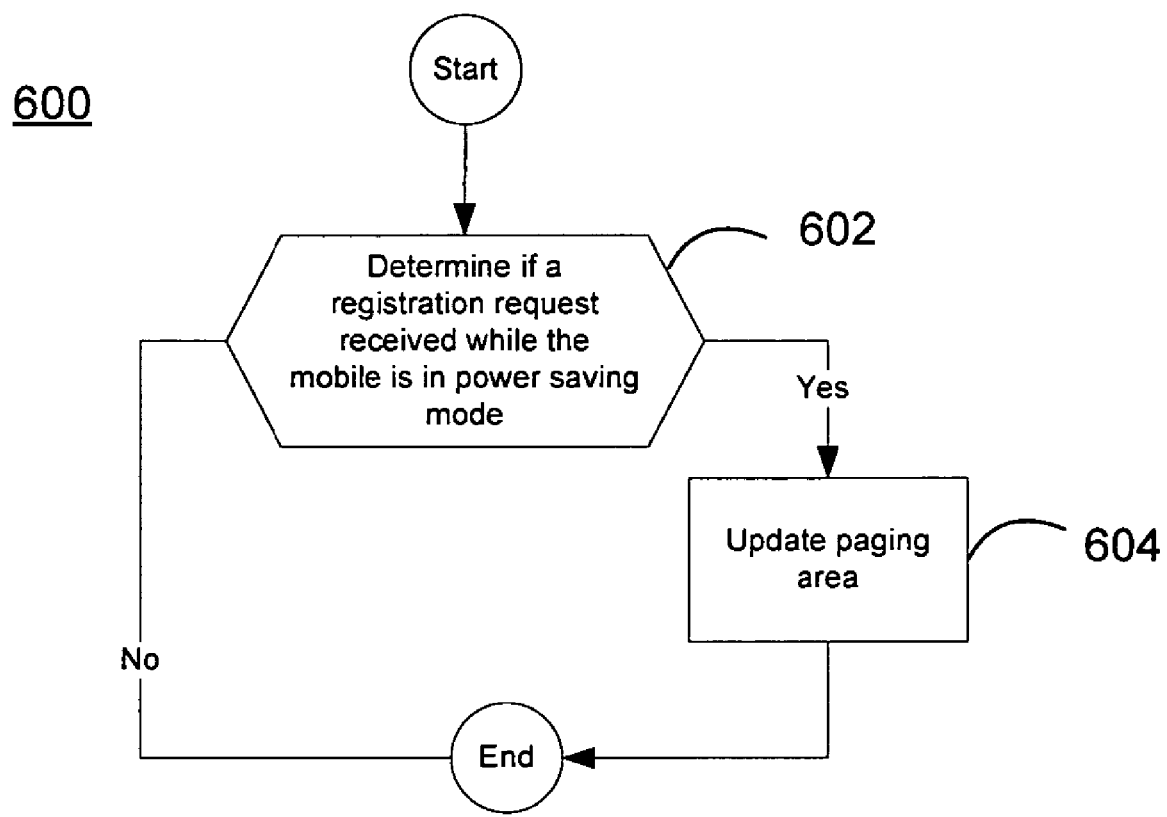
FIG. 6 illustrates a flow of methodology used by network.

FIG. 6 illustrates a flow of methodology used by network. At block 602, the network receives a registration request message from the access terminal 116 and determines if this registration is from access terminal 116 that entered a power saving mode and the type of registration. In an aspect the message may include information that allows the network to determine if this is a first registration, second registration, third registration, etc. The network accesses its database, comprising information about the access terminal 116 and information received in the message, to determine the type of registration, either first, second, third, etc. If determined that this registration is from a access terminal 116 that is in power saving mode, then at block 604, the network updates the paging area for this access terminal 116 and classifies the requesting access terminal 116 as being on the move. In an aspect, the information received request message includes the location of access terminal 116. For example the exact location or the ID of base station that is servicing the access terminal 116. Using the location information, the network may determine parameters to use to adjust the paging area.

Figure 7A:
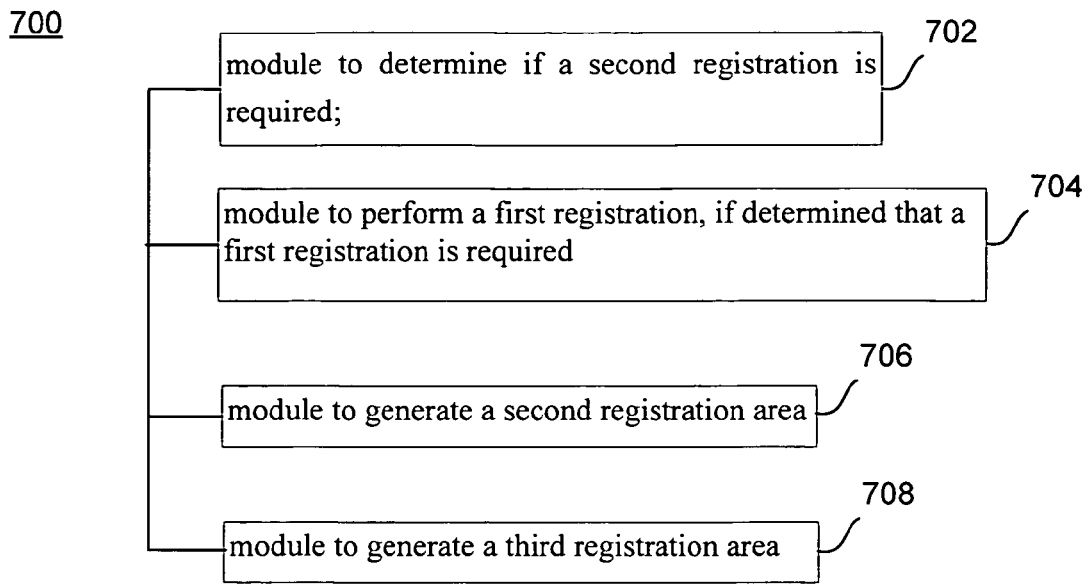
FIG. 7A illustrates the use of one or more modules to carry out the methodologies 700 according to an aspect of some embodiments

FIG. 7A illustrates the use of one or more modules to carry out the methodologies 700 according to an aspect of some embodiments. The modules referred to in FIG. 7 may be an electronic devices, processors, hardware devices, storage mediums, etc. or any combination thereof. Referring to FIG. 7, in an aspect, an apparatus comprises means to determine if a first registration is required; means to perform a first registration, if determined that a first registration is required; and means to generate a second registration area. Also, the apparatus comprises means to generate a third registration area. The means may be modules described by 702, 704, 706 and 708 of FIG. 7, respectively.

Figure 7B:
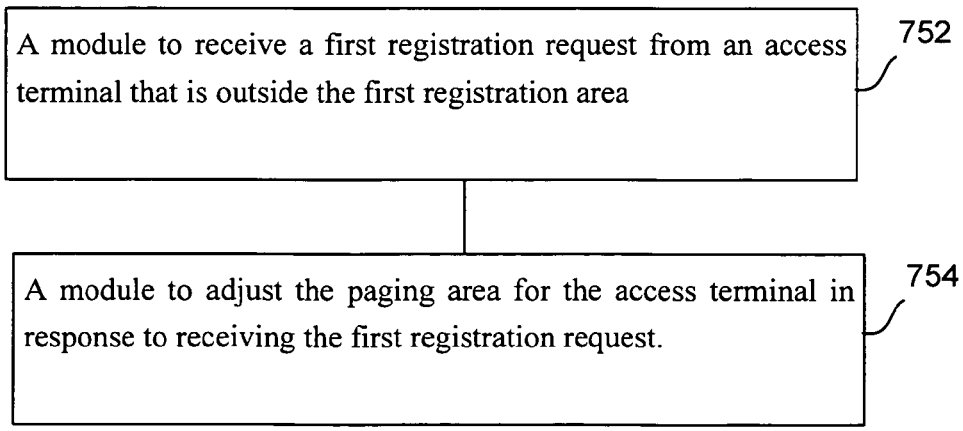
FIG. 7B illustrates the use of one or more modules to carry out the methodologies 750 according to an aspect of some embodiments

FIG. 7B illustrates the use of one or more modules to carry out the methodologies 750 according to an aspect of some embodiments. The modules referred to in FIG. 7B may be an electronic devices, processors, hardware devices, storage mediums, etc. or any combination thereof. Referring to FIG. 7B, in an aspect, an apparatus comprises means to receive a first registration request from an access terminal that is outside the first registration area; and means to adjust the paging area for the access terminal in response to receiving the first registration request. The means may be modules described by 752 and 754 of FIG. 7B, respectively.

In various embodiments, methods described herein are implemented using one or more modules to perform the steps corresponding to one or more methods of the aspect, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, compact disc, DVD, etc. to control a machine, e.g., general purpose computer with or without additional hardware, to implement all or portions of the above described methods, e.g., in one or more nodes. Accordingly, among other things, the aspect is directed to a machine-readable medium including machine executable instructions for causing a machine, e.g., processor and associated hardware, to perform one or more of the steps of the above-described method(s).

For example, access point 100 and access terminal 116 are configured to for implementing communication protocols/ standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

The techniques described herein may be implemented by various means. For example, these techniques may be implemented in hardware, software, or a combination thereof. For a hardware implementation, the processing units (e.g., processor 230 and 270, TX and RX processors 214 and 260, and so on) for these techniques may be implemented within one or more electronic devices such as application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory 232 and 272 in FIG. 2) and executed by processors (e.g., controllers 230). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed aspects is provided to enable any person skilled in the art to make or use the present aspect. Various modifications to these aspects will be readily apparent to those skilled in the art, and the generic principles defined herein may be applied to other aspects without departing from the spirit or scope of the aspect. Thus, the description is not intended to be limited to the aspects shown herein but is to be accorded the widest scope consistent with the principles and novel features disclosed herein.

What is claimed is:

1. An apparatus operable in a wireless communication system, the apparatus comprising:
   component for determining if a first registration is required;
   component for performing the first registration, wherein the first registration is performed if it is determined that the first registration is required; and
   component for generating a second registration area, wherein the second registration area comprises a radial geographic area, and wherein the radius of the radial geographic area is a distance between a first location within a first registration area and a second location outside of the first registration area.

2. The apparatus as claimed in claim 1, wherein the component for determining if the first registration is required comprises component for determining if a current location is outside the first registration area.

3. The apparatus as claimed in claim 2, wherein the component for determining if the current location is outside the first registration area comprises means for determining a current location of an access terminal.

4. The apparatus as claimed in claim 3, wherein the component for determining the current location of the access terminal comprises a global positioning system (GPS).

5. The apparatus as claimed in claim 1, further comprising:
   component for determining if a second registration is required;
   component for performing the second registration, wherein the second registration is performed if it is determined that a second registration is required; and
   component for generating a third registration area, wherein the third registration area comprises a radial geographic area, and wherein the radius of the radial geographic area is a distance between the first location within the first registration area and a third location outside of the second registration area.

6. The apparatus as claimed in claim 1, further comprising component for transitioning from the first registration area to the second registration area, wherein the first registration area is small and the second registration area is large.

7. The apparatus as claimed in claim 1, wherein the component for determining if the first registration is required comprises component for determining a location of the access terminal and component for determining if the location is outside of the first registration area.

8. The apparatus as claimed in claim 7, wherein the component for determining the location of the access terminal comprises component for using longitude and latitude values of a serving access point.

9. The apparatus as claimed in claim 8, wherein the component for determining the location of the access terminal comprises component for using a GPS to derive the location of the access terminal.

10. The apparatus as claimed in claim 8, wherein the component for determining the location of the access terminal comprises component for using information about the number of registration areas the access terminal has crossed.

11. The apparatus as claimed in claim 1, wherein the apparatus is an access terminal.

12. The apparatus as claimed in claim 1, wherein the means for generating a second registration area generates the second registration area while in a power saving mode.

13. The apparatus as claimed in claim 1, wherein the first registration area is a coverage area of a base station.

14. The apparatus as claimed in claim 13, wherein the first location is a location of the base station.

15. The apparatus as claimed in claim 13, wherein the first location is a former location of an access terminal.

16. A method at a wireless device for adjusting a registration area in a wireless communication system, the method comprising:
   determining if a first registration is required;
   performing the first registration if it is determined that the first registration is required; and
   generating a second registration area, wherein the second registration area comprises a radial geographic area, and wherein the radius of the radial geographic area is a distance between a first location within a first registration area and a second location outside of the first registration area.

17. The method as claimed in claim 16, wherein determining if the first registration is required comprises determining if a current location is outside the first registration area.

18. The method as claimed in claim 17, wherein determining if the current location is outside the first registration area comprises determining a current location of an access terminal.

19. The method as claimed in claim 18, wherein determining the current location of the access terminal comprises using a global positioning system (GPS).

20. The method as claimed in claim 16, further comprising:
determining if a second registration is required;
performing the second registration if it is determined that the second registration is required; and
generating a third registration area, wherein the third registration area comprises a radial geographic area, and wherein the radius of the radial geographic area is a distance between the first location within the first registration area and a third location outside of the second registration area.

21. The method as claimed in claim 16, further comprising transitioning from the first registration area to the second registration area, wherein the first registration area is small and the second registration area is large.

22. The method as claimed in claim 16, wherein the determining if the first registration is required comprises determining a location of the access terminal and determining if the location is outside of the first registration area.

23. The method as claimed in claim 22, wherein determining the location of the access terminal comprises using longitude and latitude values of a serving access point.

24. The method as claimed in claim 23, wherein determining the location of the access terminal comprises using a GPS to derive the location of the access terminal.

25. The method as claimed in claim 23, wherein determining the location of the access terminal comprises using information about the number of registration areas the access terminal has crossed.

26. The method as claimed in claim 16, wherein the first registration area is a coverage area of a base station.

27. The method as claimed in claim 26, wherein the first location is a location of the base station.

28. The method as claimed in claim 26, wherein the first location is a former location of an access terminal.

29. An apparatus operable in a communication system, the apparatus comprising a processor configured to:
determine if a first registration is required;
perform the first registration if it is determined that the first registration is required; and
generate a second registration area, wherein the second registration area comprises a radial geographic area, and wherein the radius of the radial geographic area is a distance between a first location within a first registration area and a second location outside of the first registration area.

30. The apparatus as claimed in claim 29, wherein the processor is further configured to determine if a current location is outside the first registration area.

31. The apparatus as claimed in claim 30, wherein the processor is further configured to determine a current location.

32. The apparatus as claimed in claim 29, wherein the processor is further configured to determine the current location using a global positioning system (GPS).

33. The apparatus as claimed in claim 29, wherein the processor is further configured to:
determine if a second registration is required;
perform the second registration if it is determined that a second registration is required; and
generate a third registration area, wherein the third registration area comprises a radial geographic area, and wherein the radius of the radial geographic area is a distance between the first location within the first registration area and a third location outside of the second registration area.

34. The apparatus as claimed in claim 29, wherein the first registration area is a coverage area of a base station.

35. The apparatus as claimed in claim 34, wherein the first location is a location of the base station.

36. The apparatus as claimed in claim 34, wherein the first location is a former location of an access terminal.

37. A non-transitory machine-readable medium comprising instructions which, when executed by a machine, cause the machine to perform operations including:
determining if a first registration is required;
performing the first registration it is determined that the first registration is required; and
generating a second registration area, wherein the second registration area comprises a radial geographic area, and wherein the radius of the radial geographic area is a distance between a first location within a first registration area and a second location outside of the first registration area.

38. The machine-readable medium as claimed in claim 37, wherein the determining if a first registration is required comprises determining if a current location is outside the first registration area.

39. The machine-readable medium as claimed in claim 38, wherein the determining if current location is outside the first registration area comprises determining a current location of an access terminal.

40. The machine-readable medium as claimed in claim 37, further comprising instructions which, when executed by a machine, cause the machine to perform operations including:
determining if a second registration is required;
performing the second registration if it is determined that the second registration is required; and
generating a third registration area, wherein the third registration area comprises a radial geographic area, and wherein the radius of the radial geographic area is a distance between the first location within the first registration area and a third location outside of the second registration area.

41. The machine-readable medium as claimed in claim 37, wherein the first registration area is a coverage area of a base station.

42. The machine-readable medium as claimed in claim 41, wherein the first location is a location of the base station.

43. The machine-readable medium as claimed in claim 41, wherein the first location is a former location of an access terminal.

44. An apparatus operable in a communication system, the apparatus comprising:
a processor configured to:
determine if a first registration is required,
perform the first registration, if it is determined that the first registration is required, and generate a second registration area, wherein the second registration area comprises a radial geographic area, and wherein the radius of the radial geographic area is a distance between a first location within a first registration area and a second location outside of the first registration area;

a memory configured to store the parameters for a registration area; and a transmitter configured to transmit a registration request.

45. An apparatus operable in a communication system, the apparatus comprising:

component for receiving a first registration request from an access terminal that is outside a first registration area; and component for adjusting the paging area for the access terminal based on an adjusted registration area for the access terminal and in response to receiving the first registration request, wherein the adjusted registration area comprises a radial geographic area, and wherein the radius of the radial geographic area is a distance between a first location within the first registration area and a second location outside of the first registration area.

46. A method for adjusting a paging area in a wireless communication system, the method comprising:

receiving a first registration request from an access terminal that is outside the first registration area; and adjusting the paging area for the access terminal based on an adjusted registration area for the access terminal and in response to receiving the first registration request, wherein the adjusted registration area comprises a radial geographic area, and wherein the radius of the radial geographic area is a distance between a first location within the first registration area and a second location outside of the first registration area.

* * * * *